(No Model.)
2 Sheets—Sheet 1.
J. G. ARRINGTON.
AMALGAMATOR.
No. 262,884.  Patented Aug. 15, 1882.
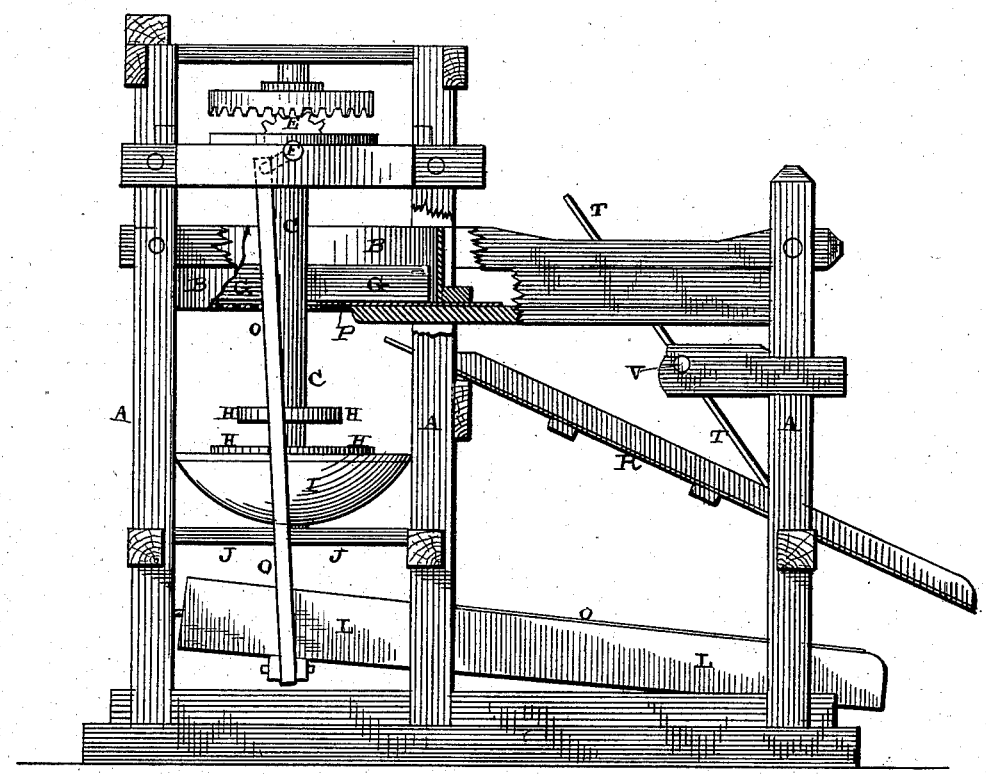

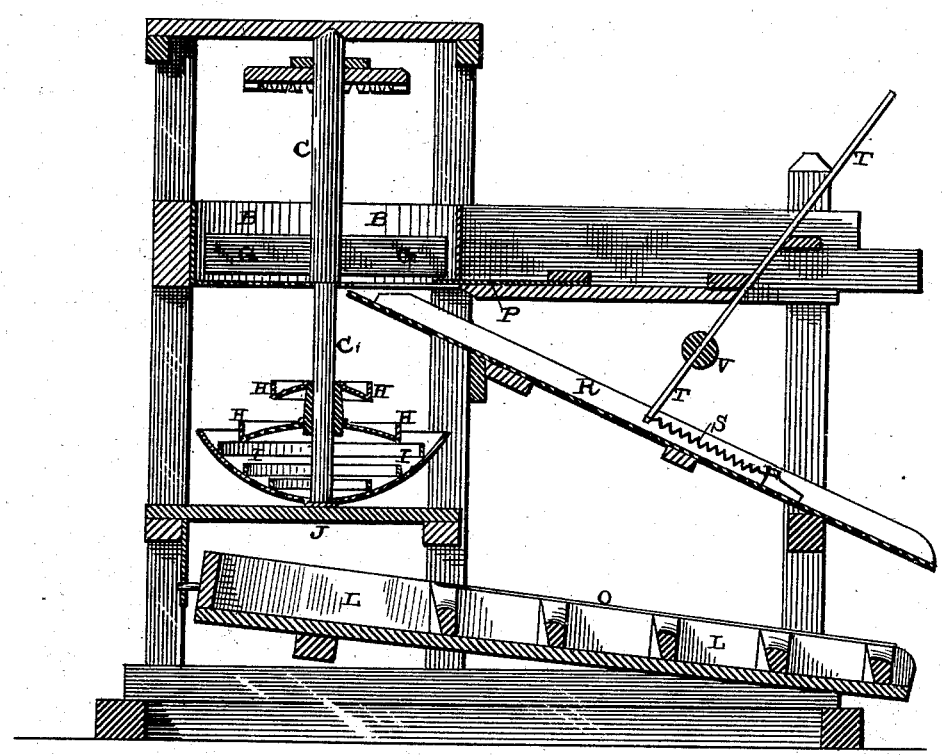

UNITED STATES PATENT OFFICE.

JOHN G. ARRINGTON, OF HILLIARDSTON, NORTH CAROLINA.

AMALGAMATOR.

SPECIFICATION forming part of Letters Patent No. 262,884, dated August 15, 1882.

Application filed March 31, 1882. (No model.)

*To all whom it may concern:*

Be it known that I, JOHN G. ARRINGTON, of Hilliardston, in the county of Nash and State of North Carolina, have invented certain new and useful Improvements in Amalgamators; and I do hereby declare the following to be a full, clear, and exact description of the invention, such as will enable others skilled in the art to which it pertains to make and use it, reference being had to the accompanying drawings, which form part of this specification.

My invention relates to an improvement in amalgamators; and it consists, first, in the combination of a shaft provided with suitable arms, a receptacle having a perforated bottom, through which the arms force the crushed quartz, suitable revolving and stationary riffles which are filled with quicksilver, and a rocking trough or riffle which is divided into compartments, each one of which has a quantity of quicksilver placed in it; second, in the combination of a revolving shaft provided with suitable arms, and suitable receptacle having a perforated bottom, a perforated slide which forms a portion of the bottom, a sliding trough, and an operating rod or lever, by means of which the trough can be moved under the receptacle, all of which will be more fully described hereinafter.

The object of my invention is to provide a means by which the crushed quartz can be brought intimately into contact with the quicksilver, so as to extract the very finest portions of the gold and silver, and to provide a means by which the larger portions of the quartz, gravels, and rocks can be instantly forced out of the receptacle.

Figure 1 is a side elevation of my invention. Fig. 2 is a vertical longitudinal section of the same. Fig. 3 is a detail view.

A represents a suitable frame-work, of any desired shape, size, or construction that may be preferred. Secured in the upper portion of this frame is the receptacle B, having a perforated bottom, and into which the crushed ore or quartz is thrown, together with any suitable amount of water. Passing vertically through this receptacle is a shaft, C, which has a suitable gear secured to its upper end, and which meshes with the driving-pinion E upon the inner end of the crank-shaft F. Secured to this shaft, inside of the receptacle, are the two arms G, which are curved upon both sides alike, and which sweep around over the bottom of the receptacle, so as to force the crushed ore or quartz through the perforated bottom. These arms also serve to force the large unbroken pieces of rock, quartz, or gravel from the receptacle, as will be more fully described hereinafter.

As the reduced quartz, together with the water, passes through the perforated bottom a portion falls into the two revolving pans H, provided with riffles, which pans are to be filled or partially filled with quicksilver, and which are secured to the shaft so as to revolve with it. All of that portion of the crushed quartz and the water which passes through the outer perforations of the bottom of the receptacle falls into the larger stationary pan I, provided with riffles, and which is secured upon the cross-piece J, which forms a bearing for the lower end of the shaft. The different riffles in this stationary pan are filled or partially filled with quicksilver, so as to catch the gold and silver in the usual manner. All of that portion of the quartz which is thrown off from the revolving pan is also caught in the riffles of the stationary pans, which are arranged one above the other, as shown. The central portion of the bottom of this stationary pan has suitable perforations made through it, so that the quartz and the water will pass through them into the upper end of the rocking riffle or cradle L. The perforations through this pan are made at such points that they do not allow the mercury in the different riffles to pass through them. As the ground ore passes from the top of one riffle it escapes, wholly or in part, through the perforations before reaching a second riffle. This riffle or cradle L is divided by suitable cross-pieces into compartments, each one of which will be filled or partially filled with quicksilver, and upon the opposite top edges of the riffle will be secured suitable stops, O, to prevent any portion of the materials from being thrown out as the riffle is rocked back and forth. This riffle is given a suitable inclination from the upper to the lower end, so that the material will gradually work off from the head toward the tail. This rocking riffle or cradle is operated by means of the connecting-rod O, which has its upper end fastened to the crank-shaft and its lower end to the arm or projection which extends from the side of the cradle. A portion of the bottom of the receptacle into which the crushed ore is thrown is formed by the perforated slide P, which, when in its proper position, forms an unbroken part of the bottom, but which, when drawn outward, leaves an opening in the bottom of the receptacle sufficiently large to allow the larger portions of rock and gravel to be forced through by the arms connected to the shaft, and thus save the trouble of having a person get into the receptacle and throw them out. Placed at a suitable inclination in the frame A is the sliding trough R, which, when at its lowest position, has its upper end just under the outer edge of the receptacle, but which, when moved upward just before the slide is drawn outward, abuts against the shaft, so as to catch whatever is forced through the opening in the bottom. Secured to this sliding trough near its lower end, by means of the suitable spring, S, is the rod T, which passes upward through the partially-revolving bearing or guide V. When it is desired to clean the stone and gravel from the receptacle it is first necessary to move the trough upward, so that its outer end will strike against the shaft, and for this purpose the operating-rod V is first drawn upward through its guide. No effect is produced upon the perforated slide until the trough has been moved upward to its full extent and a backward pull has been given to the rod T, which strikes against the slide-frame to which the perforated slide is attached, and thus moves the slide backward in the frame A. As the slide is moved backward, leaving an opening sufficiently large for any rock or gravel to be forced through by the movements of the arms attached to the shaft, the trough is immediately underneath, so as to catch them as they fall, and thus prevent them from descending into the riffle, as they otherwise would. As the rod V is released the spring attached to its lower end first forces it forward, so as to return the slide to position, and then the weight of the perforated trough causes it to slide downward in the frame to its first position. By means of the spring the one rod V is made to operate both the trough and the slide. When the rod is first drawn upward the spring is not brought into play, further than to exert just a sufficient pull upon the trough to move it upward until its upper end strikes against the shaft; but as soon as the trough stops moving the whole of the pull on the rod is transferred to the spring. The stretching of the spring allows the rod to continue its movement far enough to move the slide back; but as soon as the rod is released the contraction of the spring moves the rod back, and this movement forces the slide into place.

Having thus described my invention, I claim—

1. The receptacle B, having a perforated bottom, in combination with the shaft provided with arms, and mechanism for revolving the shaft, a slide which forms a part of the bottom, and a lever for moving the slide, substantially as shown.

2. The combination of the receptacle B, having a perforated bottom, the shaft provided with arms and a means for revolving the shaft, the trough, the slide which forms a part of the bottom, and a lever for moving the slide and trough, substantially as described.

3. The combination of the receptacle B, the slide P, the shaft C, having arms G, and a means for operating the shaft, the trough R, lever T, and spring S, substantially as set forth.

4. The combination of the receptacle B, having a perforated bottom, with sliding trough, constructed and supported as described, whereby its upper end is moved upward under the opening in the bottom of the receptacle, a suitable support for the trough, the slide, a means for operating both slide and trough, the shaft provided with arms, and a means for revolving the shaft, substantially as specified.

5. The combination of the receptacle B, having a perforated bottom, the shaft provided with an arm to sweep over this bottom, riffles attached to the shaft so as to revolve with it, a stationary pan provided with riffles, and a cradle, L, and a means for operating it, substantially as described.

In testimony whereof I affix my signature in presence of two witnesses.

JOHN G. ARRINGTON.

Witnesses:
F. A. LEHMANN,
W. W. MORTIMER.